US008379235B2

(12) United States Patent
Berke

(10) Patent No.: US 8,379,235 B2
(45) Date of Patent: Feb. 19, 2013

(54) METHOD FOR PROVIDING COPY JOBS WITH OR WITHOUT BANNER SHEETS

(75) Inventor: David Berke, London (GB)

(73) Assignee: Xerox Corporation, Norwalk, CT (US)

( * ) Notice: Subject to any disclaimer, the term of this patent is extended or adjusted under 35 U.S.C. 154(b) by 793 days.

(21) Appl. No.: 12/565,783

(22) Filed: Sep. 24, 2009

(65) Prior Publication Data

US 2011/0068532 A1 Mar. 24, 2011

(51) Int. Cl.
*G06F 3/12* (2006.01)
*G06K 15/00* (2006.01)

(52) U.S. Cl. ........................................ 358/1.13; 358/1.1

(58) Field of Classification Search .................. 358/1.1, 358/1.7, 1.13, 1.15, 1.16, 1.18, 3.28; 156/277; 271/207
See application file for complete search history.

(56) References Cited

U.S. PATENT DOCUMENTS

| | | | | |
|---|---|---|---|---|
| 5,316,279 | A | 5/1994 | Corona et al. | |
| 6,373,588 | B1 * | 4/2002 | Fischer et al. | 358/1.16 |
| 6,577,907 | B1 * | 6/2003 | Czyszczewski et al. | 700/17 |
| 6,747,229 | B2 * | 6/2004 | Carlson | 209/583 |
| 7,151,615 | B2 | 12/2006 | Mantell | |
| 7,839,531 | B2 * | 11/2010 | Sugiyama | 358/1.18 |
| 2004/0156064 | A1 * | 8/2004 | Owen et al. | 358/1.13 |

* cited by examiner

*Primary Examiner* — Gabriel Garcia

(57) ABSTRACT

A method for creating and inserting a banner sheet in an output bin of a multi-function device for copy jobs. Thus, the user can leave the copy job in progress, safe in the knowledge that the copy will be recognized and filed along with other print jobs.

11 Claims, 3 Drawing Sheets

METHOD FOR PROVIDING COPY JOBS WITH OR WITHOUT BANNER SHEETS

A method is disclosed herein that relates to multi-function devices that generate images onto media or sheets. In particular, the disclosed method relates to the use of banner sheets in multi-function device copy jobs.

Typically, multi-function devices, such as, for example, the Xerox Document Centre 230 ™ offers shared printing, copying, faxing, and scanning solutions specifically designed for the networked office. One limitation to this arrangement is that the printed hardcopy output in the shared resource is often provided in a limited number or even a single output bin. Most printers designed for resource sharing try to accommodate this problem by skewing or offsetting entire print jobs from each other. An example is in U.S. Pat. No. 5,316,279 to Corona et al. where a control system selects which standard size sheet supply tray of the printer will feed the copy sheets for a selected job set, and will automatically feed and print a cover sheet of a larger size of different orientation before or after the job set copy sheets are feed. The sheet stacker may desirably stack the copy sheets of the job sets commonly edge aligned, but so that at least one edge area of the cover sheets extends substantially from at least one edge of the stack of copy sheets of the job sets to provide an exposed printed banner strip for clear job sets segregation and separation even if the commonly stacked plural job sets of copy sheets are misaligned in subsequent handling.

Heretofore, the use of banner sheets has been relatively narrow in scope and purpose reflecting the capabilities and intended use of the shared printers. For example, one banner sheet has typically been outputted on top of each print job submitted. If multiple copies of a particular job are requested, then multiple banner sheets are also produced. Essentially, the only option available has been whether to print the banner sheet with the job, or not, and even that option is not adjustable in some instances by the user because it is pre-designed at the shared print server that spools the print job to the printer. This creates waste since the banner sheets are often discarded as soon as a print job is picked up. An aspect of this problem is addressed in U.S. Pat. No. 7,151,615 B2 to David A. Mantell, which includes a method that provides printing a print job and placing it into an output bin followed with a pause before printing a banner sheet of that print job. The banner sheet will not be printed if the print job is removed from the output bin before the pause concludes, thereby eliminating waste and expediting any subsequent printing that may follow. The entirety of the above-mentioned prior art is incorporated herein by reference.

However, there is still a need for improvement in handling copy jobs since copy and print jobs are normally output to a common tray and only print jobs have banner sheets. As is typical, multi-function devices combine print and copy output to the same tray. Therefore, a user making a copy is obliged to stay by the machine as the job completes to pick up the copies. Additionally, it is often difficult to distinguish between copy and print output, as copies are not headed by a banner sheet.

Accordingly, in answer to the above-mentioned problem, a method is disclosed that allows the creation and insertion of a banner sheet for copy jobs. This allows the user to leave the copy job in progress, safe in the knowledge that their copy will be recognized and filed along with the print jobs.

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

Figure 1:
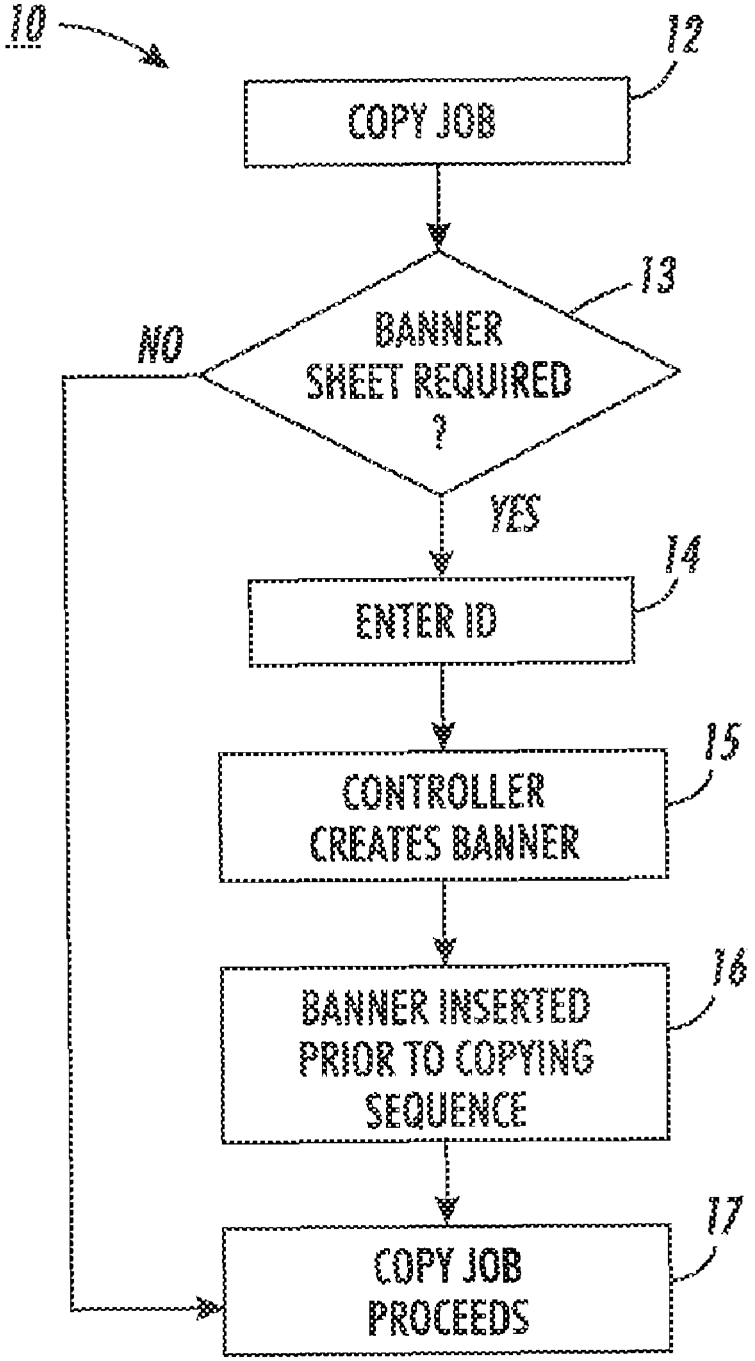
FIG. 1 is a flow chart of the copy job banner creation process in accordance with the present disclosure.

In a preferred embodiment of the present disclosure in FIG. 1, a flow chart 10 of the decision making process of creating and inserting a banner for a copying job in a multi-function device is shown. When a user submits a copy job in block 12 in accordance with the present disclosure of distinguishing copy job output in a multi-functional device, he/she is asked in block 13 whether a banner sheet is required. If the user selects NO, the copy job simply proceeds in block 17. If the user selects YES, a soft keypad (UI) is displayed allowing the user to enter their identification in block 14 which is to be marked centrally on the banner sheet. A copy controller uses this information in block 15 to create a banner sheet. In block 16, the banner sheet is inserted prior to beginning of the copying sequence and, thereafter, in block 17 the copying sequence proceeds as programmed in block 12.

Figure 2:
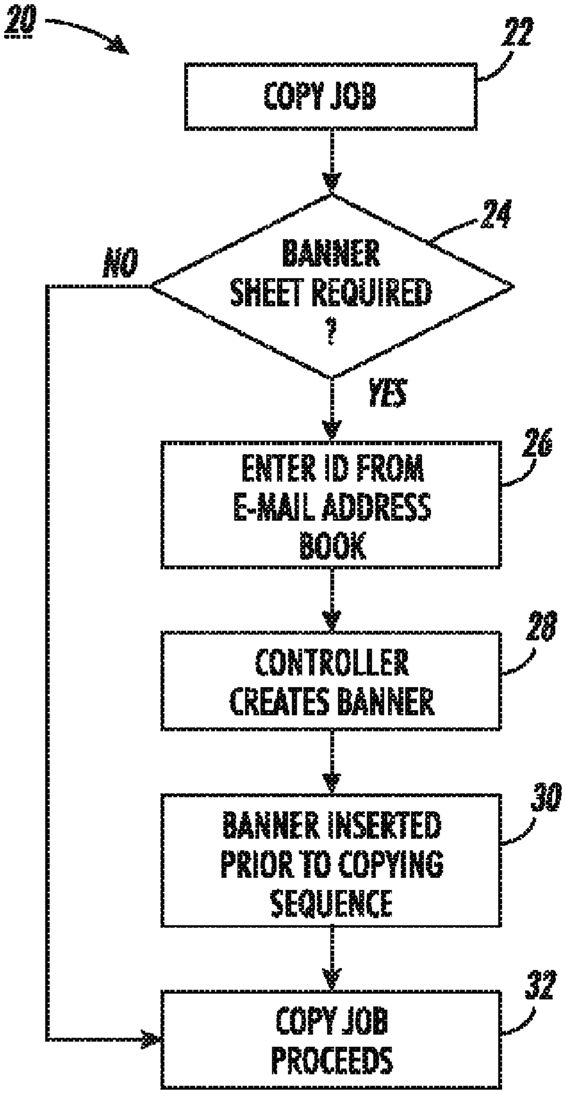
FIG. 2 is a flow chart of an alternative embodiment of the copy job banner creation process that includes a specific user identification technique.

Another embodiment of the present disclosure 20 that prints a banner sheet for copy jobs is shown in FIG. 2 where a copy job is dialed into the multi-function device in block 22. A query is made as to whether a banner sheet is required in block 24. If the answer is NO, the copy job proceeds in block 32. However, if the answer is YES, then the user is asked to enter his/her copy banner identification from an electronic mail address book in block 26. This eliminates the need to enter identification via the soft keypad in FIG. 1. Afterwards, in block 28, a controller creates a banner that includes the identification information inserted in block 26 and in block 30 the banner is inserted in an output bin prior to the copying sequence beginning. Thereafter, the copy job proceeds as indicated in block 32.

Figure 3:
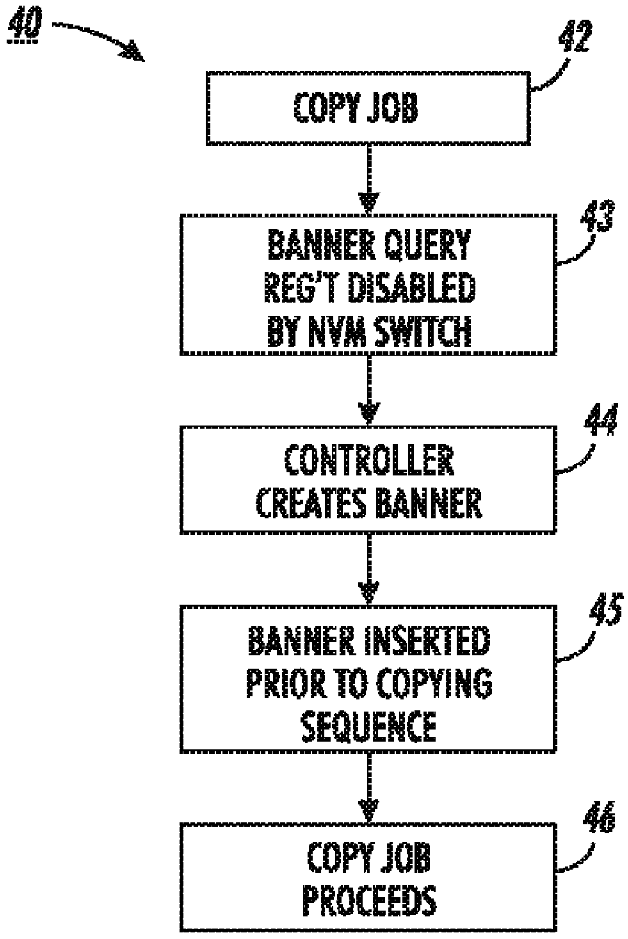
FIG. 3 shows a flow chart of yet another embodiment of the copy job banner process of the present disclosure that includes disabling a banner creation inquiry.

In yet another embodiment of the present disclosure 40 in FIG. 3, a copy job is dialed up in block 42. The banner sheet inquiry in FIGS. 1 and 2 is disabled by a non-volatile memory switch in block 43 and a controller in block 44 creates a banner sheet which optionally could be simply identified as "Local Copy". The banner sheet in block 45 is inserted into an output bin prior to beginning of the copying sequence. Afterwards, the copy job is completed as depicted in block 46.

It should now be known that a method has been disclosed for printing a banner sheet for multi-function device copy jobs, such as, for example, those requested by a casual user. A banner sheet is printed prior to the copy output to identify the job in a way similar to a print or facsimile job. The user is queried to determine if a banner sheet is required and for identification information prior to initiation of copying. This feature could be configurable to disable the query to determine if a banner sheet is required. Also, the system could be tied into an electronic mail address book to simplify user identification. Further, the banner could optionally be simply identified as "Local Copy" rather the requiring a user to enter his or her name.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

Unless specifically recited in a claim, steps or components of claims should not be implied or imported from the specification or any other claims as to any particular order, number, position, size, shape, angle, color, or material.

What is claimed is:

1. A method for a shared multi-function device that includes a platen for use in a copier mode thereof to provide copy jobs for a walk-up casual user with banner sheets to its output bin, comprising:

A) placing a document to be copied onto said platen of said multi-function device;

B) pressing a member on said multi-function device and thereby requesting a copy job by said casual user;

C) querying whether a banner sheet is required by said multi-function device in response to said casual user pressing said member on said multi-function device, said multi-function device also being adapted to allow disabling of said banner sheet query by said walk-up casual user, if desired;

a. if the answer to the banner sheet inquiry is NO, then proceeding with the copying job;

b. if the answer to the banner sheet inquiry is YES, then proceeding with;

D) entering Local Copy as user identification information by said casual user;

E) creating a banner sheet by said multi-function device;

F) inserting said banner sheet into said bin prior to proceeding with the copying sequence; and G) completing the copy job.

2. The method of claim 1, including providing a soft keypad for entering said identification information.

3. The method of claim 1, including entering said Local Copy user identification information from an electronic mail address book.

4. The method of claim 1, including disabling said banner sheet query with a non-volatile memory switch.

5. The method of claim 1, including creating a banner sheet for each copy job with each copy job being placed into the same output bin.

6. The method of claim 1, including providing a controller for creating said banner sheet.

7. A method for a shared, non-networked, multi-function device to provide casual copy jobs with banner sheets to its output bin when using only a copying function of said shared, non-networked, multi-function device, comprising:

A) requesting a copy job from a hardcopy document;

B) querying by said multi-function device whether a banner sheet is required, said querying by said multi-function device also being adapted to be disabled by a casual user, if desired;

a. if the answer to the banner sheet inquiry is NO, then proceeding with the copying job;

b. if the answer to the banner sheet inquiry is YES, then proceeding with;

C) entering user identification information by said casual user;

D) creating a banner sheet;

E) inserting said banner sheet into said bin prior to proceeding with the copying sequence; and F) completing the copy job.

8. The method of claim 7, including creating a banner sheet for each copy job.

9. The method of claim 8, including inputting the phrase Local Copy to replace said user identification information.

10. The method of claim 7, including disabling said banner sheet query with a non-volatile memory switch.

11. The method of claim 8, including creating said banner sheet with the use of a controller.

* * * * *